Figures 1, 2:
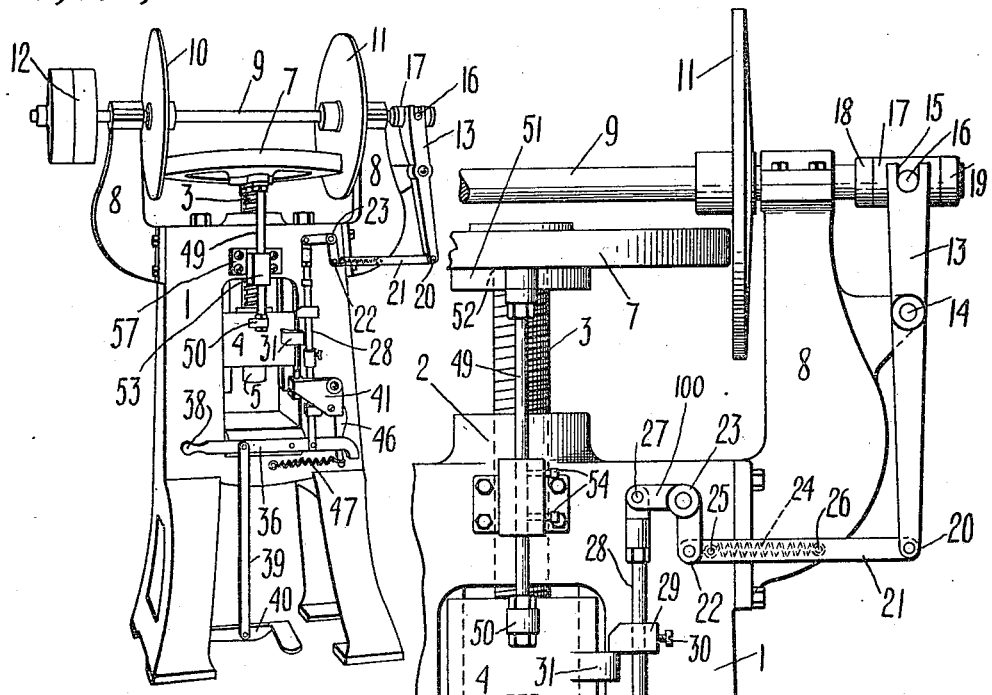

J. A. KREITLER.
POWER DRIVEN SCREW PRESS.
APPLICATION FILED MAR. 13, 1915.

1,271,728.

Patented July 9, 1918.

WITNESSES:
Arthur Choquet
Charlton J. Milam.

INVENTOR.
John A. Kreitler
BY
G. E. Terwilliger ATTORNEY

UNITED STATES PATENT OFFICE.

JOHN A. KREITLER, OF NEWARK, NEW JERSEY.

POWER-DRIVEN SCREW-PRESS.

1,271,728.  Specification of Letters Patent.  Patented July 9, 1918.

Application filed March 13, 1915. Serial No. 14,094.

*To all whom it may concern:*

Be it known that I, JOHN A. KREITLER, a citizen of the United States, residing in the city of Newark, county of Essex, and State of New Jersey, have invented certain new and useful Improvements in Power-Driven Screw-Presses, of which the following is a specification.

My invention relates to screw presses of the type operated by friction drive or friction disks which under normal conditions are constantly rotating. In presses of this general type a vertical threaded spindle is mounted in a stationary frame, and carries at its upper end a friction wheel, and at its lower end a die. This spindle is rotated by bringing into contact with the periphery of the friction wheel carried by it one of two friction disks mounted on opposite sides of the friction wheel on a horizontal axis, and capable of being moved simultaneously in the direction of such axis so as to bring either of the friction disks into engagement with the adjacent periphery of the friction wheel. By this common mode of construction it is easy to cause the spindle to rotate in either direction. However, since the spindle is usually weighted, and is itself comparatively heavy, there is a tendency for it to descend slowly by gravity after it has been raised to its upper neutral position by contact with the proper disk This tendency to drop automatically from its uppermost position requires some check. In many machines of this general type the operating gear is so arranged that after the spindle is dropped a certain distance it will bring the friction disk, which raises the spindle into contact with the friction wheel carried by the spindle, and this action will again elevate the spindle. The result of such construction is that the machine will assume a position of rest in which the friction wheel on the top of the spindle will bear lightly against the elevating friction disk, and with just enough force to overcome the tendency of gravity to cause the spindle to fall. This effect is very objectionable for the reason that it results in the wearing away of the friction wheel at the point of contact when the machine is idle.

One of the objects of my invention is to overcome the tendency of the spindle to drop automatically by the influence of its weight, and this is accomplished in a preferred embodiment of my invention by interposing between the spindle and the frame sufficient frictional resistance to balance the dropping tendency.

A further object of my invention is to construct the actuating gear in such a manner that the shock caused by the moving parts engaging, or tripping, this gear will not be transmitted to the lever by which the operator controls the machine. My invention also relates to certain improvements in this controlling mechanism, which will more fully appear.

Figure 3:
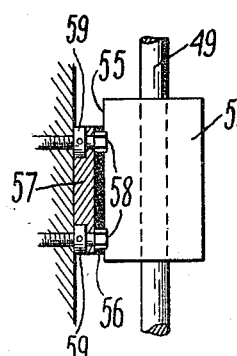
Figure 4:
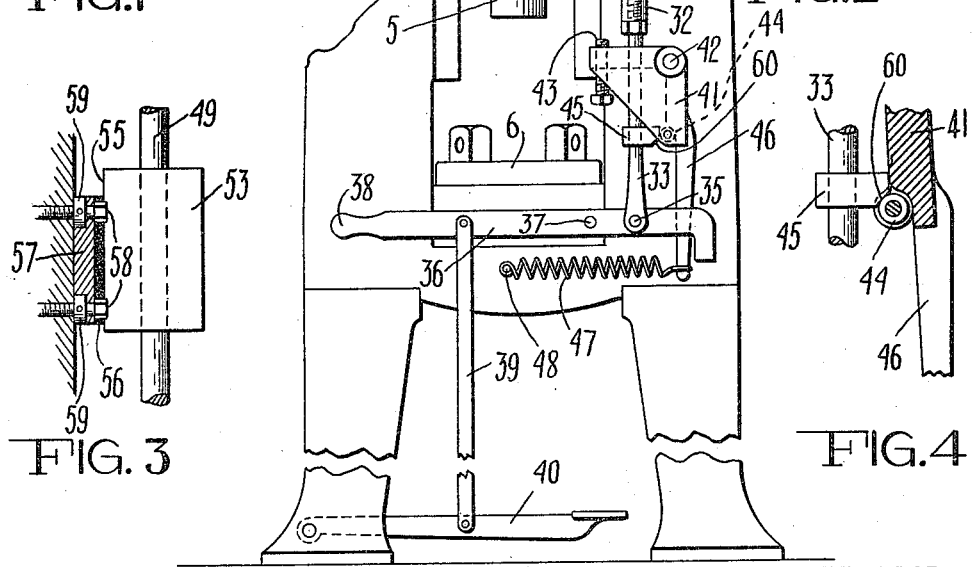

In the accompanying drawings, which form a part of this specification, Figure 1 is a perspective view of a machine embodying my invention. Fig. 2 is a front elevation of a portion of such a machine upon an enlarged scale. Fig. 3 is an enlarged fragmentary view showing part of the friction mechanism, and Fig. 4 is an enlarged fragmentary view showing a part of the controlling mechanism.

Referring to the drawings in detail, the numeral 1 designates a stationary frame in which is a vertical screw threaded passage 2, through which passes the externally threaded vertical spindle 3. The lower end of this spindle carries a weight 4, and is provided with a depending portion 5 for the reception of any suitable dies or the like, and which may be used in coöperation with a die or dies fastened to the bedplate 6. The upper end of the spindle is secured to a friction wheel which is adapted to rotate in a horizontal plane, and by its rotation to either elevate or depress the spindle and its associated parts by virtue of the engagement of the screw threads upon the spindle with the screw threaded opening 2. Upon either side of the frame of the machine are the upwardly extending arms 8, which span the wheel 7. A horizontal shaft 9 is journaled in these arms above the wheel 7. To this shaft are secured in any suitable manner the two friction disks 10 and 11, the inner surfaces of which extend in close proximity to the outer periphery of the wheel 7, although the distance between these surfaces is slightly greater than the external diameter of the wheel 7. Any suitable means, such as a pulley 12, may be provided for rotating the shaft 9. This shaft is longitudinally slidable in its bearings in the arms 8, so as to bring either of the friction disks into contact with the friction wheel 7. The shaft 9 being rotated always in the same direction it will be obvious that the wheel 7 may be caused to rotate either clockwise, or counter-clockwise, depending upon which of the friction disks 10 and 11 is at the time in contact with its periphery, and it will also be obvious that if the wheel 7 is rotated in one direction, the spindle, and its associated parts, will be elevated while if it is rotated in the reverse direction they will be depressed, thus effecting through the selective engagement of the disks 10 and 11 with the wheel 7, a controllable reciprocation of the lower extremity 5 of the spindle.

The means for controlling this selective engagement includes a lever 13, pivoted at 14, to a fixed part of the frame and carrying at its upper end forks 15 in engagement with pins 16, carried by a spool 17, which is confined between the two collars 18 and 19, fixed to the shaft 9. It will be apparent that by swinging the lever 13 about its pivot, the shaft 9 will be forced either to the right or to the left, as the case may be.

The lower end of the lever 13 is connected at 20 to a link 21, which in turn is pivoted at 22 to a bellcrank lever 100, which is pivoted to the frame at 23. A spring 24, which is fastened at 25 to the lever 21, and at 26 to the frame, normally urges the link 21 toward the right of the drawing in Figs. 1 and 2, thereby urging the shaft 9 into its lefthand position and tending to cause the elevating disk 11 to come into contact with the wheel 7.

The opposite extremity 27 of the bellcrank lever 100 is connected to a rod 28, carrying a lug 29, which is slidable on the rod and adapted to be held in adjusted position by any suitable means, such as a set screw 30. This lug is adapted to be engaged by a fixed lug 31, carried by the weight 4, upon the upward stroke of the spindle. The lower end of the rod 28 enters the sleeve 32, which is carried by the upper end of a rod 33. Any suitable means, such as a wing screw 34, may be used for clamping the lower end of the rod 28 in the sleeve 32, when it is desired to operate the machine automatically in the manner which will later be described in detail.

The rod 33 is pivoted at 35 to an operating lever 36, which in turn is pivoted at 37 to the main frame. This operating lever is provided with a handle portion 38, and is also provided with a link 39, leading to a treadle 40, so that the lever may be operated conveniently either by hand or by foot.

A triangular frame 41 is pivoted to the frame at 42, and is provided with adjustable means, such as a bolt or set screw 43, adapted to engage the lug 31 on the down stroke of the spindle. A roller 44 is journaled in the lower end of the frame and is adapted for engagement with a lug 45 carried by the rod 33. The frame is also provided with a depending arm 46 which is normally urged to the left by means of a spring 47, which is attached to the frame at 48.

A vertical rod 49 is mounted at 50 to the weight 4 and at its upper end is secured to a collar 51, which loosely encircles a hub 52 on the upper end of the spindle, so that the rod 49 moves with the spindle in a longitudinal direction but does not revolve with it. Upon this rod is mounted a block 53 which is adjustable upon the rod by means of set screws 54. The face 55 of this block bears against a friction pad 56 of leather, or other suitable material, riveted or otherwise secured to a plate 57, which is mounted upon the face of the frame by means of bolts 58, as shown in detail in Fig. 3. These bolts are provided with collars 59 so that the plate 57 may be moved toward or away from the face of the frame, thereby diminishing or increasing the pressure between the friction pad and the face 55 of the block 53.

The operation of the machine is as follows:

If the lever 36 is depressed either by means of its handle or the treadle 40, this action will lift the tapered dog 45 allowing the roller 44 to pass beneath its taper 60 into the position shown in Fig. 4, in response to the pull of the spring 47 upon the lower end of the arm 46. The roller will retain this position because the spring 47 is stronger in its action than the spring 24. The lifting of the dog 45 will likewise raise the rod 33 and the abutting rod 28, thereby tilting the bellcrank lever 100 and drawing the link 21 and lever 13 to the left of the Fig. 2. This will shift the sliding shaft 9 to the right, bringing the lefthand or depressing disk 10 into contact with the periphery of the wheel 7, thereby rotating this wheel and, consequently, the spindle 3 in such a direction as to cause the spindle and the die to be forced downward by the lower end thereof. The reciprocating parts will move downward until the lug 31 touches the set screw 43, thereby tilting the triangular frame 41 into the position shown in Fig. 2, in which position the roller will clear the tapered dog 45, thus permitting the parts to resume their initial position. This, however, releases the opposition to the spring 24 which now comes into play and moves the sliding shaft 9 to the left, thereby bringing the elevating disk 11 into contact with the periphery of the wheel 7, thus reversing the downward movement of the spindle and die carried by it, and causing them to ascend.

The screw 43 having been set so that it will engage the lug 31 just before the die delivers its blow to the work on the bed 6, the blow will be struck by the die approximately at the time when the sliding shaft 9 is in its initial position, so that the blow is the result of the momentum of the parts. Near the end of its upward stroke the lug 31 will engage the lug 29, raising the rod 28 and actuating the train of parts connected to it just as it was initially actuated by the movement of the lever 36. This will automatically shift the reversing mechanism by bringing the depressing disk 10 into contact with the friction wheel 7. The parts will now start on their downward travel but as they do so the lug 31 drops away from the lug 29, which follows it in response to the action of the spring 24, until the depressing disk 10 is no longer in contact with the friction wheel 7. This establishes a neutral position in which the friction wheel 7 is in contact with neither the depressing disk 10 nor the elevating disk 11. At this point, however, the weight of the parts connected with the spindle 3 comes into play, and the spindle will slowly revolve by virtue of its weight. As it revolves the lug 31 progresses farther and farther downward and being followed by the lug 29 results in the elevating disk 11 eventually being brought into contact with the friction wheel 7. The particular outcome of this is that there will be an oscillating of the parts until a condition of rest is established in which the elevating disk 11 lightly bears against the friction wheel 7. If this were permitted the surface of the disk 11 would grind off the contact surface of the friction wheel 7, flattening it more and more. To overcome this effect of the weight of the parts, I have interposed between the reciprocating parts and a stationary portion of the frame, the block 53, and friction pad 56. The pressure between this block and pad is so adjusted by means of the bolts 58 that the friction between the face 55 and pad 56 just overcomes the tendency of the spindle 3 to revolve by reason of its weight, and the weight of the parts which it carries, so that instead of there being an oscillation of the shaft 9 and of the two friction disks, finally resulting in permanent contact between the elevating disk 11 and the friction wheel 7, the parts remain in the neutral position, that is the position in which the friction wheel 7 is in contact with neither disk.

It is to be noted that since the lower end of the rod 28 is capable of free upward movement within the sleeve 32, the blow which the lug 31 strikes against the lug 29 on the upward travel of the former, will not be transmitted to the handle 38, nor to the treadle 40. However, when it is desired to cause the machine to operate continuously, without need for the operator to rest his hand upon the handle 38, or his foot upon the treadle, the lower end of the rod 28 may be clamped in the sleeve 32 by means of the wing screw 34. It will be obvious that with the parts so clamped together, the lifting of the lug 29 by means of the lug 31 on the upward travel of the spindle will raise the rod 33 and the lug 45, just as they would be raised by depressing the handle 38 or the treadle 40 in the manner above described, when it is desired to control by hand or foot each stroke of the die.

It will be seen that the positions of the lug 29 and the block 53 may both be adjusted to allow for an adjustment in length of the stroke desired. It will also be seen that by virtue of the action of the roller 44 upon the tapered lug 45 a single quick depression of the left-hand of the lever 36 is sufficient to maintain the operating mechanism in position for a complete downward stroke, without maintaining pressure upon either the handle 38 or the treadle 40.

While I have illustrated and described only one specific embodiment of my device, I appreciate that it is susceptible of wide application, and I do not desire to be limited to the precise construction shown and described.

Having thus described my invention, I claim:

1. In combination in a machine tool, a double disk friction drive, a reciprocating member actuated by the said friction drive, a stationary braking surface, and a brake shoe normally in engagement therewith and moving with the reciprocating member for keeping the reciprocating member in neutral or stationary position out of contact with either of said disks at the top of the stroke.

2. In combination in a machine tool, a double disk friction drive, a reciprocating member actuated by the said friction drive, a stationary braking surface, a brake shoe normally in engagement therewith and moving with the reciprocating member for keeping the reciprocating member in neutral or stationary position out of contact with either of said disks at the top of the stroke, and means for altering the pressure between said friction surface and brake shoe.

3. In a friction-drive screw press, a frame, a vertical spindle in threaded engagement therewith, a friction wheel on said spindle, a pair of friction disks adapted for selective engagement with said friction wheel, and a friction pad moving longitudinally with the spindle and normally in frictional engagement with a stationary part for preventing the descent of the spindle by gravity.

4. In a friction-drive screw press, a frame, a vertical spindle in threaded engagement therewith, a friction wheel on said spindle, a pair of friction disks adapted for selective engagement with said friction wheel, a friction pad moving with said spindle and engaging a part fixed with reference to said frame for preventing the descent of the spindle by gravity, and means for adjusting the position of said friction pad axially with reference to said spindle.

5. In a machine tool, a power driven member and a control device therefor including a longitudinally movable member for actuating said device when moved in one direction, manually operating means therefor, said movable member being movable in its operating direction independently of said manually operating means, and automatic means for operating said member independently of the manually operating means.

6. In a machine tool, a power driven member and a control device therefor, including a rod for actuating said member when moved longitudinally in one direction, means for moving said rod in its operating direction, said rod being capable of motion in its operating direction without movement of said means, and automatic means for operating said member independently of the manually operating means.

7. In control mechanism for machine tools, a longitudinally movable member for actuating a tool on its working stroke, a resilient means for urging said member in a direction opposite to its operating movement, means for moving said member in its operating direction against said resilient means and automatic means for maintaining said member in its actuating position, said member being transversely divided so as to be capable of transmitting a thrust but not a pull.

8. In control mechanism for machine tools, a longitudinally movable member for actuating a tool on its working stroke, a resilient means for urging said member in a direction opposite to its operating movement, means for moving said member in its operating direction against said resilient means, automatic means for maintaining said member in its actuating position and means for restoring said maintaining means to its initial position at the end of a cycle of operations of said machine, said member being transversely divided so as to be capable of transmitting a thrust but not a pull.

9. In control mechanism for machine tools, a member forming a part of the control mechanism and adapted to actuate the same by movement in one direction, resilient means normally urging said member in the opposite direction, a tapered dog on said member, means for urging said member in its operating direction against the force of said resilient means, a retaining device adapted to engage said dog and retain said member in operative position and resilient means for urging said retaining device into its retaining position, the force of said resilient means upon said retaining device at its point of engagement with said dog being superior to the force of said first named resilient means upon said dog.

10. In control mechanism for machine tools, a member forming a part of the control mechanism and adapted to actuate the same by movement in one direction, resilient means normally urging said member in the opposite direction, a tapered dog on said member, means for urging said member in its operating direction against the force of said resilient means, a retaining device adapted to engage said dog and retain said member in operative position, resilient means for urging said retaining device into its retaining position, the force of said resilient means upon said retaining device at its point of engagement with said dog being superior to the force of said first named resilient means upon said dog, and means for restoring said retaining means to its initial position at a definite point in the operation of said machine.

11. In control mechanism for machine tools, a longitudinally movable member for actuating a tool on its working stroke, resilient means for urging said member in a direction opposite to its operating movement, means for moving said member in its operating direction against said resilient means, automatic means for maintaining said member in its actuating position, said member being transversely divided so as to be capable of transmitting a thrust, but not a pull, and means for detachably joining the parts of said member at said point of division.

12. In control mechanism for machine tools, a longitudinally movable member for actuating a tool on its working stroke, resilient means for urging said member in a direction opposite to its operating movement, means for moving said member in its operating direction against said resilient means, automatic means for maintaining said member in its actuating position, said member being transversely divided so as to be capable of transmitting a thrust but not a pull, means for restoring said maintaining means to its initial position at the end of a cycle of operations of said machine, and means for detachably joining the parts of said member at said point of division.

13. In combination in a machine tool, a frame, a vertical spindle in threaded engagement therewith, a friction wheel on said spindle, a pair of friction disks adapted for selective engagement with said friction wheel, a pair of members in frictional engagement, one of said members moving with said spindle and the other mounted upon a part fixed with reference to the frame for preventing the descent of the spindle by gravity and means for adjusting one of said members vertically.

JOHN A. KREITLER.

Witnesses:
G. E. TERWILLIGER,
ELEANOR PACKER.

Copies of this patent may be obtained for five cents each, by addressing the "Commissioner of Patents, Washington, D. C."